United States Patent [19]

Clostermeyer et al.

[11] Patent Number: 4,599,844
[45] Date of Patent: Jul. 15, 1986

[54] LARGE BALING PRESS FOR AGRICULTURAL PRODUCTS

[75] Inventors: Gerhard Clostermeyer, Gütersloh; Werner Müller, Harsewinkel, both of Fed. Rep. of Germany

[73] Assignee: Claas Ohg, Harsewinkel, Fed. Rep. of Germany

[21] Appl. No.: 644,124

[22] Filed: Aug. 23, 1984

[30] Foreign Application Priority Data

Sep. 2, 1983 [DE] Fed. Rep. of Germany ....... 3331671

[51] Int. Cl.⁴ ............................................. B65B 13/18
[52] U.S. Cl. ......................................... 53/118; 53/119; 53/587; 56/343
[58] Field of Search ................. 53/118, 119, 211, 212, 53/523, 589, 587; 56/341, 343; 83/355, 350, 610, 611, 612

[56] References Cited

U.S. PATENT DOCUMENTS

| | | | |
|---|---|---|---|
| 1,193,506 | 8/1916 | Brown | 53/587 |
| 1,849,443 | 3/1932 | Wheeler, Jr. et al. | 83/611 |
| 1,976,156 | 10/1934 | Beidler | 83/611 |
| 2,782,853 | 2/1957 | Heffelfinger | 83/350 |
| 2,880,560 | 4/1959 | Gibson | 53/587 |
| 2,893,189 | 7/1959 | Lancaster | 53/587 |
| 3,052,073 | 9/1962 | Johansen et al. | 53/118 |
| 3,263,390 | 8/1966 | Dexter | 53/118 |
| 4,296,595 | 10/1981 | Meiners | 53/587 |
| 4,366,665 | 1/1983 | Van Ginhoven et al. | 56/341 |
| 4,409,784 | 10/1983 | Van Ginhoven et al. | 56/341 |

Primary Examiner—John Sipos
Assistant Examiner—Donald R. Studebaker
Attorney, Agent, or Firm—Michael J. Striker

[57] ABSTRACT

A baling press for agricultural products has a pressing chamber limited by a plurality of winding rollers, and a device for wrapping a finished bale with a wrapping material, which is provied for its threading into the pressing chamber with guiding elements between wrapping material drawing rollers and the pressing chamber.

7 Claims, 3 Drawing Figures

LARGE BALING PRESS FOR AGRICULTURAL PRODUCTS

BACKGROUND OF THE INVENTION

The present invention relates to a large baling press for agricultural products. More particularly, it relates to a large baling press with a pressing chamber which is limited by winding rollers, and a device for wrapping a finished bale with a wrapping material supplied by drawing rollers to an inlet gap formed by two winding rollers to introduce the wrapping material into the pressing chamber.

U.S. Pat. No. 4,366,665 discloses a baling press with a wrapping device in which a web-shaped wrapping material is supplied, after production of the bale, with the flowing-in pressing material to the pressing chamber. No guiding means are provided between the drawing rollers for the wrapping material and the supplied pressing material mat, for threading the initial end of the wrapping material. In this construction the light and very thin web material can deviate under the action of various kinds. In addition, the above described baling press acts in accordance with the so-called "Vermeer-Bander Principle" in accordance with which feeding of the wrapping material is possible in the region of the pressing material supply.

SUMMARY OF THE INVENTION

Accordingly, it is an object of the present invention to provide a baling press which avoids the disadvantages of the prior art.

More particularly, it is an object of the present invention to provide a large baling press which guarantees that the respective initial part of a wrapping material for wrapping of a finished bale is brought into an inlet gap between two neighboring winding rollers and thereby into a pressing chamber, separately from the supply of the pressing material and without distortions by lateral deviation or the like, and so that simultaneously the separation of the wrapping material is functionally secured after complete wrapping of the product bale.

In keeping with these objects and with others which will become apparent hereinafter, one feature of the present invention resides, briefly stated, in a large baling press in which a plurality of guiding elements which secure a running direction of a wrapping material are provided between wrapping material drawing rollers and an inlet gap between two winding rollers.

When the baling press is designed in accordance with these features it avoids the disadvantages of the prior art and provides for the above-mentioned objects.

In accordance with another feature of the present invention, the guiding element includes a first guiding sheet which faces toward a separating cutter and is located above a cutter movement path, and a second guiding sheet extending to the region between the winding rollers and provided with a pocket-shaped recess for a cutter entrance, with an upper edge forming a cutting abutment for the wrapping material.

The guiding sheets can be composed of an antimagnetic material.

The pocket-shaped recess of the second guiding sheet can be extended by a projection which is composed of an elastic material and extends to the gap between the two winding rollers.

One of the drawing rollers which is driven can be provided with an outer surface of a high friction coefficient.

Finally, a deviating roller can be arranged deeper than the drawing rollers and upstream of the latter so as to increase an angle of wrapping of the wrapping material around the driven drawing roller.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
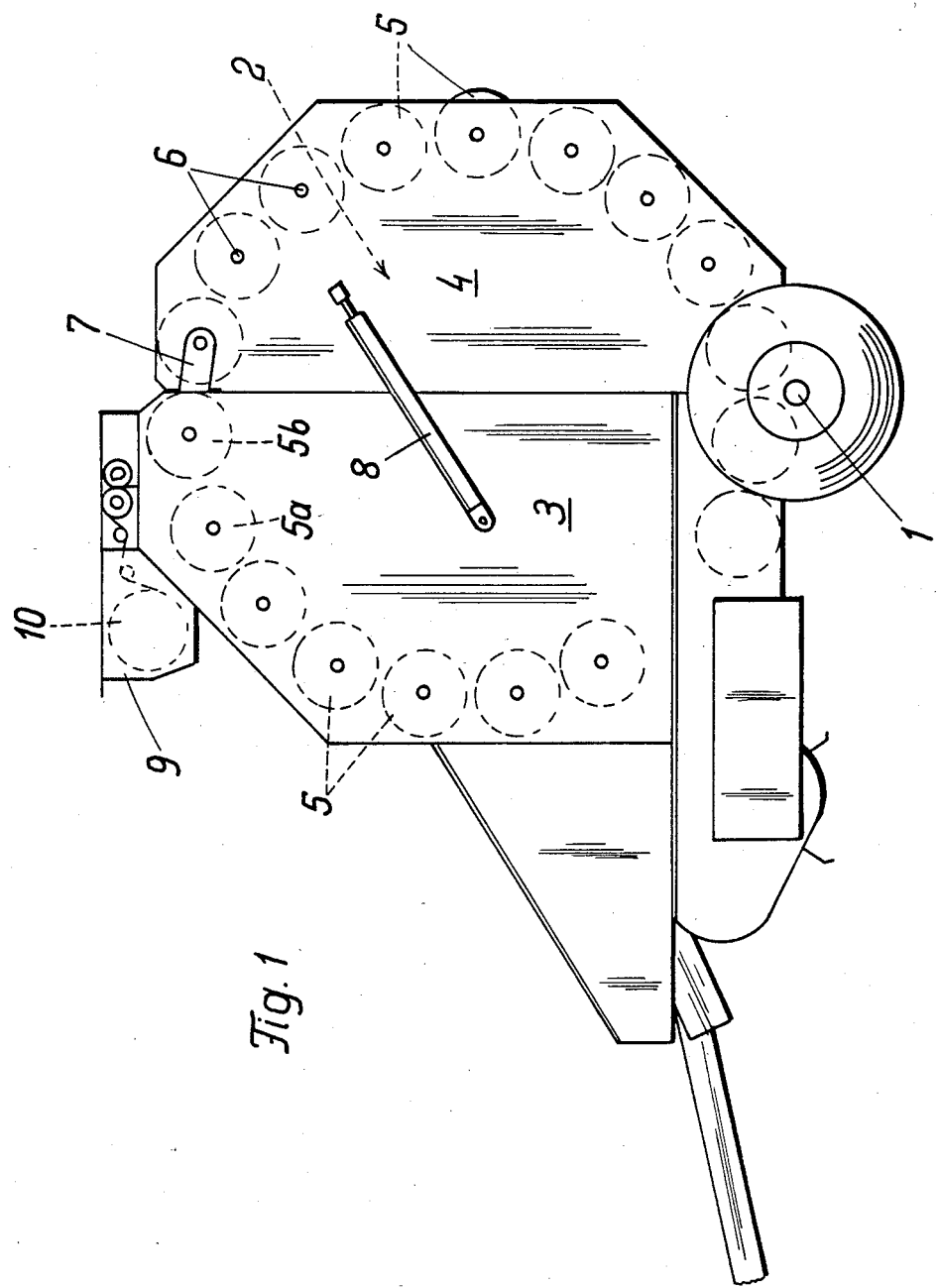
FIG. 1 is a schematic view of a large baling press in accordance with the present invention.

A baling press in accordance with the present invention has a pressing chamber which identified with reference numeral 2 and arranged above a running axle 1. The pressing chamber is formed of two housing halves 3 and 4. The pressing chamber is limited radially by driven winding rollers 5 which are arranged on axles 6. The axles 6 are supported in lateral walls of the respective housing halves 3 and 4 arranged at a distance from one another.

The housing half 4 is turnably connected via consoles 7 with a frame-fixed housing 3. It can be turned upwardly by a cylinder-piston unit 8 for unloading of the finished bale. A container 9 for storing of a wrapping material 10 extends in the region of an upper machine limit between the lateral walls of the machine.

In the vicinity of the container 9, two cooperating drawing rollers 11 and 12 extend parallel to the container 9 between the lateral walls. The wrapping material is held or guided between the drawing rollers 11 and 12. The drawing roller 11 is connected via a free runner 13 with its driving axle 14. A not shown mechanical or hydraulic drive acts upon the driving axle 14 during transportation of the wrapping material 10 for such a long time, until the wrapping material 10 is taken or drawn by a rotating pressing bale 15.

The drawing roller 12 possesses a pressing function for the wrapping material in the drawing rollers and is on this ground freely rotatably supported on an end of a double-armed turning lever 16. A pulling spring 17 engages the other end of the turning arm 16 so as to tighten the drawing roller 12 against the roller 11.

Drawing of the wrapping material 10 for its feeding into the pressing chamber is performed by drive of the roller 11. For providing a wide-angled engagement of the wrapping material 10 with the surface of the roller 11, a deviating roller 18 is arranged deeper and upstream of the roller pair 11 and 12 as considered in running direction of the wrapping material 10.

A separating mechanism 19 for the wrapping material 10, which acts after complete wrapping of the finished bale 15, includes a turnably supported cutter holder 20 with a cutting blade 21, an arresting device 22, and a spring bar 30 supported on the fixed housing. The wrapping material 10 runs between the drawing rollers 11 and 12 and both winding rollers 5a and 5b in a guiding passage 23 extending between the machine lateral walls and formed by sheet walls 24 and 25 which are arranged in a funnel-shaped manner. The sheet wall 24 facing toward the separating mechanism 19 extends closely to the cutter holder 20, when the latter is located in its extended end position. The sheet wall 25 extends continuously to the region of an inlet gap 26 for the wrapping material 10 between the neighboring winding rollers 5a and 5b.

Figure 2:
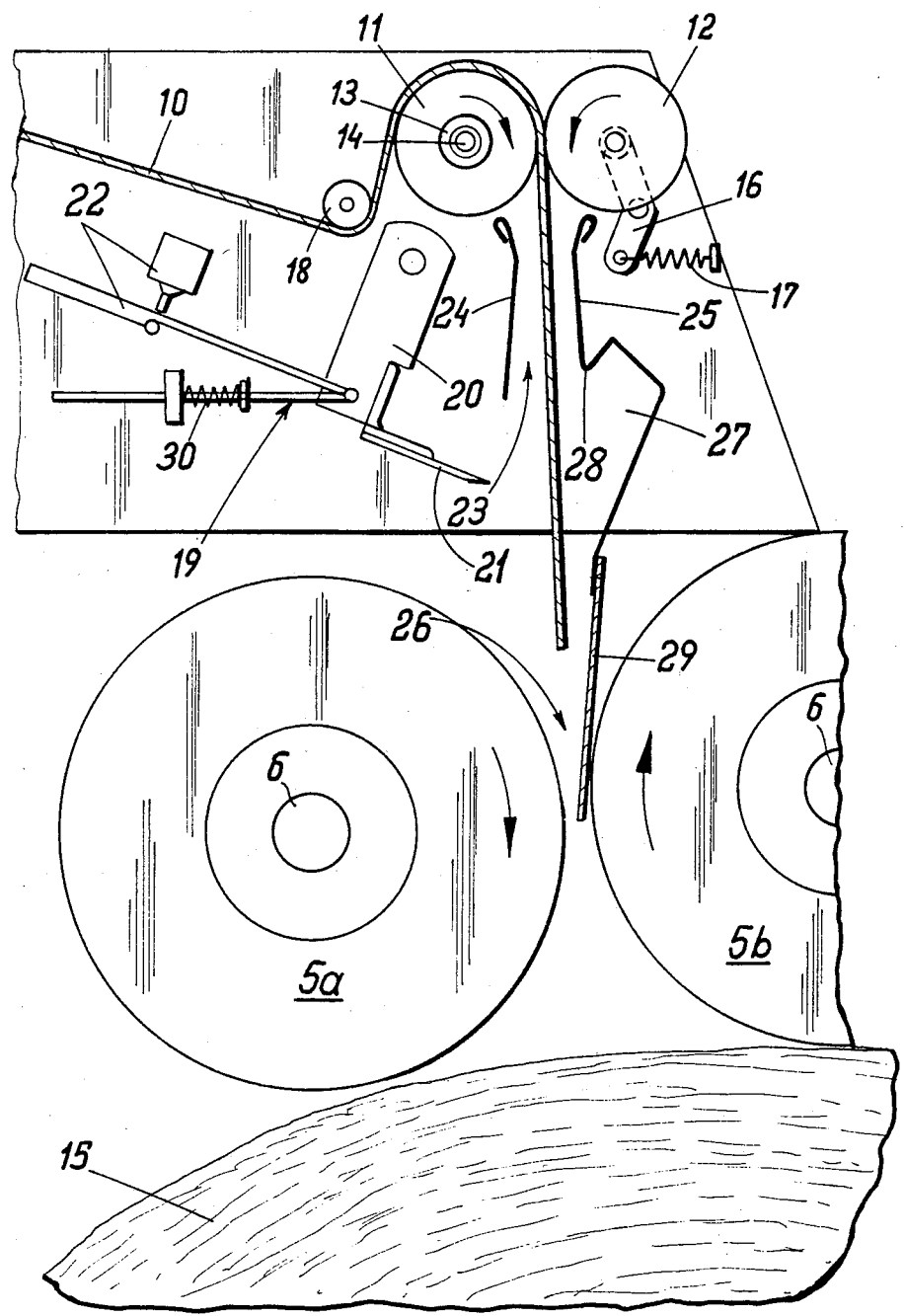
FIG. 2 is a view showing a head-side machine region between the drawing rollers and winding rollers which form an inlet gap to a pressing chamber, as seen from the sides.
Figure 3:
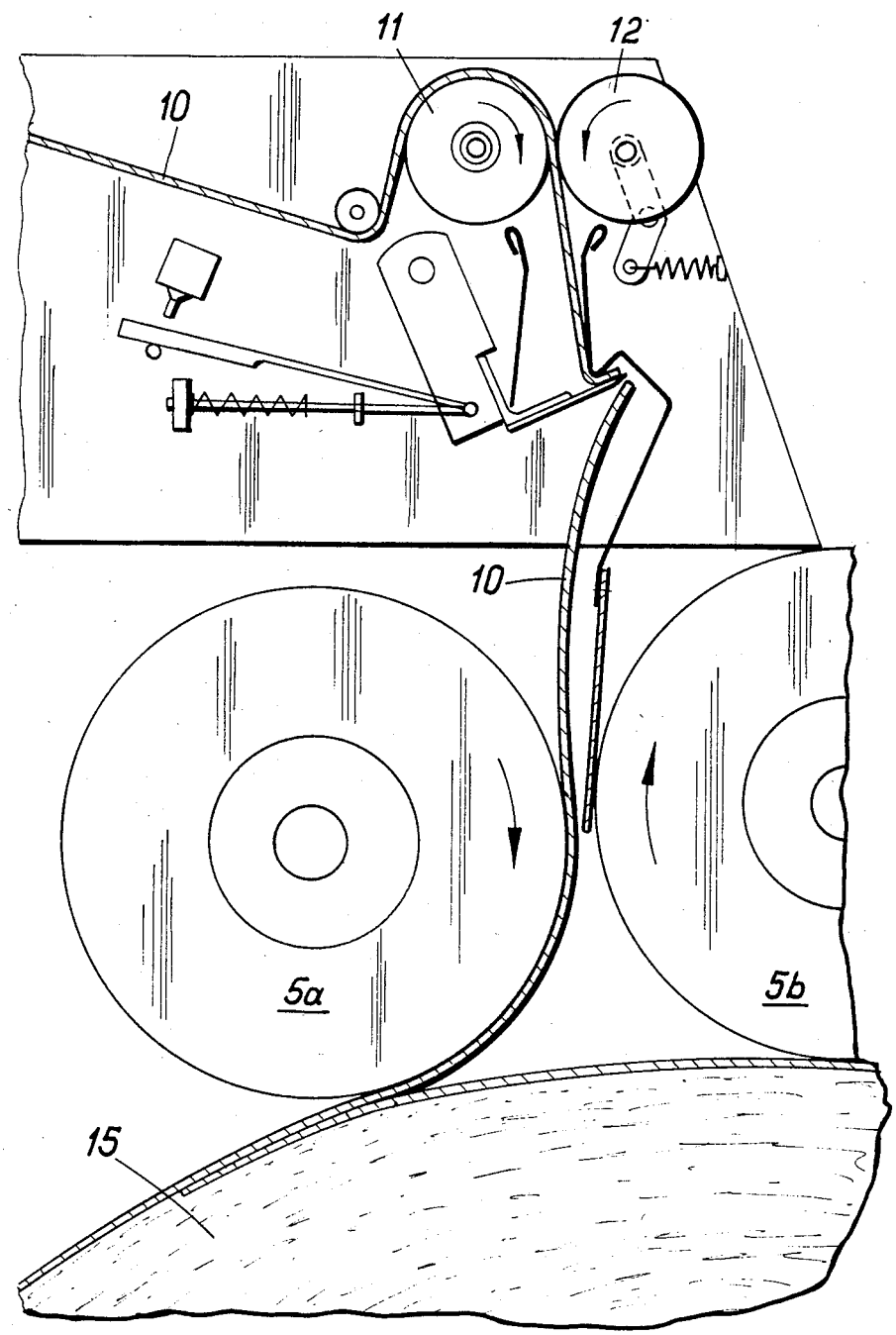
FIG. 3 is a view showing the machine region in accordance with FIG. 2 after termination of the wrapping process and after the separation of the wrapping material path.

In the turning region of the cutter holder 20 and its cutting blade 21 the sheet valve 25 has a pocket-shaped recess 27 for insertion of the cutter. An upper edge 28 of the recess 27 forms a cutting abutment for the wrapping material 10. In the shown embodiment of FIGS. 2 and 3 a projection 29 of an elastic material follows the pocket-shaped recess 27. The projection 29 or the lower wall part extends into the inlet gap 26 and reliably prevents the contact of the wrapping material with the winding roller 6b which otherwise can release a faulty feeding of the wrapping material. Wind flows which negatively act on the hanging-down end of the wrapping material 10 are shielded prior to the beginning of the binding process reliably by the walls 24 and 25.

It will be understood that each of the elements described above, or two or more together, may also find a useful application in other types of constructions differing from the types described above.

While the invention has been illustrated and described as embodied in a baling press, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A baling press for agricultural products, comprising means forming a pressing chamber of a predetermined width; a plurality of spaced winding rollers limiting said pressing chamber; and means for wrapping a finished product bale including a supply container for a wrapping material, a pair of drawing rollers for drawing the wrapping material, an inlet gap formed by two of said winding rollers rotating in the same direction to introduce the wrapping material into said pressing chamber, said drawing rollers being located above said two winding rollers so that a portion of the wrapping material drawn by said drawing rollers hangs vertically downwardly in direction towards said inlet gap, a separating device for separating a portion of the wrapping material and including a separating cutter movable in the region between said drawing rollers and said two winding rollers along a predetermined path, and two guiding elements located between said drawing rollers and said inlet gap formed by said winding rollers, said guiding elements being spaced from one another and extending the width of said pressing chamber, said guiding elements having different length including a first guiding element which is located closer to said separting cutter and is shorter, and a second guiding element which is located farther from said separating cutter and is longer, said second guiding element having a recess into which said separating cutter is inserted during cutting, said second guiding element also having a guiding projection extending downwardly into said inlet gap so as to allow said portion of the wrapping material to contact only one of said two winding rollers and prevent its contact with the other of said two winding rollers to thereby feed the portion of the wrapping material through said inlet gap into said pressing chamber.

2. A baling press as defined in claim 1, wherein said recess of said second guiding element is provided with an upper edge forming a counter cutter.

3. A baling press as defined in claim 1, wherein said guiding sheets are composed of an antimagnetic material.

4. A baling press as defined in claim 2, wherein said projection is composed of an elastic material.

5. A baling press as defined in claim 1, wherein one of said drawing rollers is driven and has an outer surface with a high friction value.

6. A baling press as defined in claim 1, wherein said drawing rollers include a first drawing roller which is driven; and further comprising means for increasing an angle with which the wrapping material surrounds said first drawing roller.

7. A baling press as defined in claim 6, wherein said increasing means includes a deviating roller located lower than said drawing rollers and arranged upstream of the latter as considered in the running direction of the wrapping material.

* * * * *